(12) United States Patent
Kobayashi

(10) Patent No.: US 6,714,999 B2
(45) Date of Patent: Mar. 30, 2004

(54) PORTABLE ELECTRONIC APPARATUS AND COMMUNICATION METHOD FOR PROTOCOL SELECTION PROCESSING OF A PORTABLE ELECTRONIC APPARATUS

(75) Inventor: Tsutomu Kobayashi, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 264 days.

(21) Appl. No.: 09/902,687

(22) Filed: Jul. 12, 2001

(65) Prior Publication Data

US 2002/0035652 A1 Mar. 21, 2002

(30) Foreign Application Priority Data

Sep. 21, 2000 (JP) .................. 2000-287382
Mar. 21, 2001 (JP) .................. 2001-081281

(51) Int. Cl.$^7$ ................................ G06F 3/00
(52) U.S. Cl. ............... 710/11; 710/301; 709/228
(58) Field of Search ................ 710/11, 301; 709/228

(56) References Cited

U.S. PATENT DOCUMENTS 5,349,649 A * 9/1994 Iijima .................. 709/228
5,678,029 A  10/1997 Iijima
6,209,050 B1 * 3/2001 Iho et al. .............. 710/301

FOREIGN PATENT DOCUMENTS

EP  0 282 992 A2  9/1988
EP  0 578 457 A2  1/1994

OTHER PUBLICATIONS

Patent Abstracts of Japan of JP 04 0321193 A, Nov. 11, 1992.

* cited by examiner

Primary Examiner—Jeffrey Gaffin
Assistant Examiner—Justin Knapp
(74) Attorney, Agent, or Firm—Pillsbury Winthrop LLP

(57) ABSTRACT

In an IC card having a control element such as programmable nonvolatile memory and CPU, and incorporating an IC chip including function for data input and output from outside, plural choices are provided in a storage region in part of protocol processing, the designation information for designating it is stored in storage regions, and when an event relating to this transmission block occurs, communication is processing by the protocol process according to the choice selected on the basis of the designation information.

4 Claims, 6 Drawing Sheets

PORTABLE ELECTRONIC APPARATUS AND COMMUNICATION METHOD FOR PROTOCOL SELECTION PROCESSING OF A PORTABLE ELECTRONIC APPARATUS

CROSS-REFERENCE TO RELATED APPLICATIONS

This application is based upon and claims the benefit of priority from the prior Japanese Patent Applications No. 2000-287382, filed Sep. 21, 2000; and No. 2001-081281, filed Mar. 21, 2001, the entire contents of both of which are incorporated herein by reference.

BACKGROUND OF THE INVENTION

The present invention relates to a portable electronic apparatus generally known as an IC card, having a control element such as programmable nonvolatile memory or CPU, and incorporating an IC chip including means for data input and output from outside.

The IC card recently noticed in the field of electronic commerce (EC) mostly conforms to the standard protocol specified in ISO/IEC7816-3, and it is designed to exchange data with an external device by this standard protocol. In the case of standard protocol T=1 (block transmission system), there are, aside from an information block (I block) for data transmission, a receive ready block (R block) for noticing to the transmission side if the received text is abnormal, or requesting to send again the previously received text, and a supervisor block (S block) for requesting extension of processing time or extension of partner side transmission data length.

Concerning these transmission blocks, only basic points are described in the ISO/IEC7816-3, and plural processing means are described in a certain event, and the function is limited about error processing when building up a system using an IC card.

When developing a new IC card to be applied in an existing system being thus built up, a program conforming to such limited protocol function must be developed. Generally, an IC card follows a life cycle of card manufacture, issue and application (user environment), and it is sometimes necessary to modify or newly develop the apparatus for manufacturing and issuing the card in order to conform to the limited protocol.

BRIEF SUMMARY OF THE INVENTION

It is hence an object of the invention to provide a portable electronic apparatus capable of executing selectively depending on the designation information by preparing plural choices in part of protocol processing.

The invention relates to a portable electronic apparatus comprising storing means for storing designation information for designating choices for proper processing in a storage region; input and output means connected to an external device, for inputting and outputting of data; processing means, having plural choices at least in part of a specified protocol, for processing the input and output data of the input and output means according to the specified protocol; and control means for selecting a proper one out of the plural choices of the processing means according to the designation information stored in the storage means and controlling to process communication with the external device by using the input and output means and the processing means according to the specified protocol including the selected choice.

In the invention, as described above, the protocol is determined by setting plural choices in part of a specified protocol, and setting designation information for selecting one from the choices, and selecting the choice for processing depending on the designation information. By processing communication with an external terminal device or the like according to the protocol, in the life cycle, for example, by distinguishing the manufacturing stage or issuing stage from the application stage, it is possible to transmit without displaying error information in the R block that cannot be handled in the terminal device in the application stage. It is thus possible to process communication by an appropriate protocol depending on the situation, so that a portable electronic apparatus capable of processing communication at high reliability can be presented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the invention are described below while referring to the accompanying drawings.

<Structure of Portable Electronic Apparatus>

Figure 1:
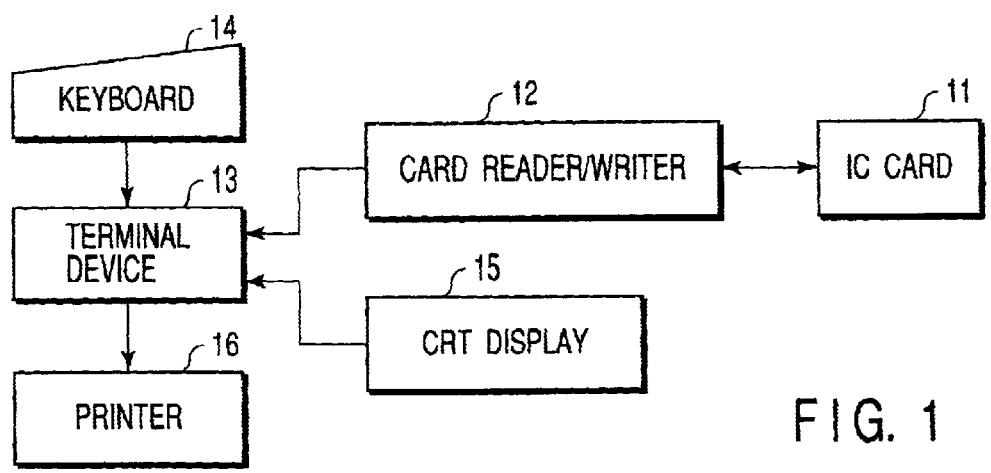
FIG. 1 is a block diagram showing a structural example of an IC card system handling an IC card according to an embodiment of the invention.

FIG. 1 is a block diagram showing a structural example of an IC card system handling an IC card according to an embodiment of the invention. In this IC card system, the IC card 11 is connected to a terminal device 13 through a card reader-writer 12, and a keyboard 14, a CRT display device 15, and printer 16 are connected to the terminal device 13.

Figure 2:
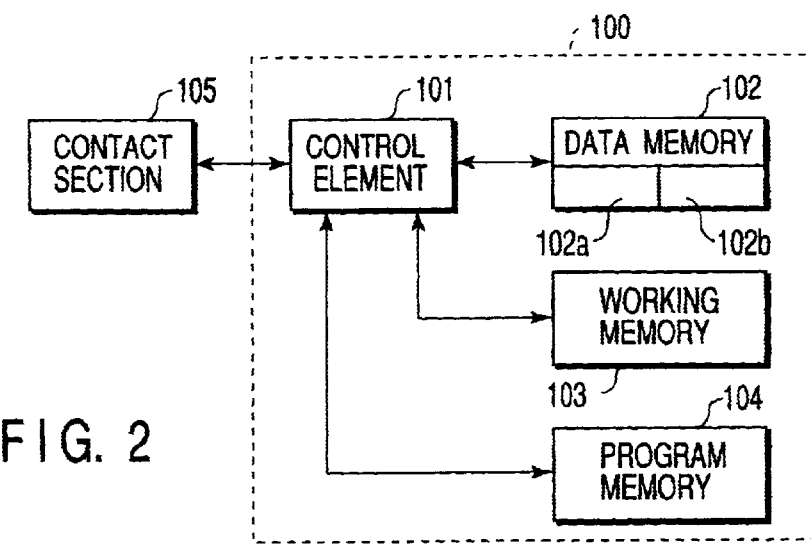
FIG. 2 is a block diagram showing a structural example of IC card.

FIG. 2 shows a structural example of IC card 11, which comprises a control element (for example, CPU) 101 as control section, a nonvolatile data memory 102 in which stored data cannot be erased, a working memory 103, a program memory 104, and a contact section 105 for contacting electrically with the card reader-writer 12. Of them, the area surrounded by broken line (control element 101, data memory 102, working memory 103, and program memory 104) is composed in one IC chip (or plural IC chips) 100, and the IC chip 100 and contact section 105 are integrally formed in an IC module, and buried in the IC card main body.

The data memory 102 is used in storage of various data, and is composed of, for example, EEPROM. The data memory 102 includes an area 102a storing designation information for designating plural protocol processings, and an area 102b storing life cycle information updated in every life cycle (manufacture, issue, application).

The designation information can be rewritten from outside of the card by using rewrite command or the like. Not allowing arbitrarily, in this case, it may be designed to limit the rewriting person by using the known security technology such as verification of password.

The working memory 103 is a memory for temporarily holding processing data when the control element 101 makes processing or the like, and it is composed of, for example, RAM. The program memory 104 is composed of, for example, mask ROM, and is to store the processing program of the control element 101 or the like.

<Example of Start-stop System Semi-duplex Block Transmission Protocol>

The IC card 11 applied in the invention is design to conform to "Start-stop system semi-duplex transmission protocol" specified in ISO/IEC7816-3, and this protocol is explained below.

Figure 3:
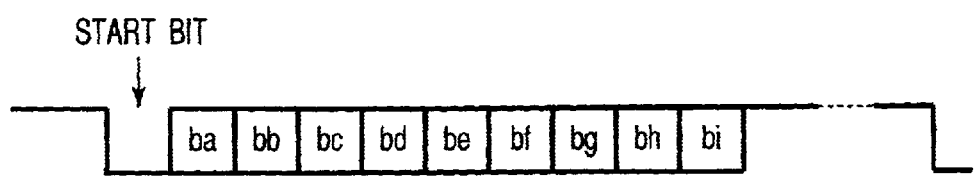
FIG. 3 is a diagram showing a configuration of character transmitted and received in transmission protocol.

FIG. 3 shows configuration of character transmitted and received in this protocol. The character is composed of 10 continuous bits, and the beginning is the start bit, and the data to be transmitted or received is expressed in the subsequent 8 bits (ba to bh), and the tenth bit bi is used as parity check bit. The number of "1" in bits ba to bh is set to be even. The character is generally handled as positive logic (LSB-first: the beginning bit is the lowest bit).

Figure 4:
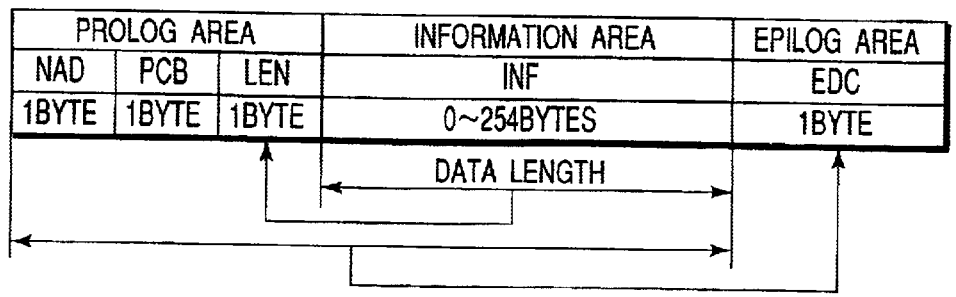
FIG. 4 is a diagram showing a block transmitted and received in transmission protocol.

FIG. 4 shows a block transmitted and received in this protocol. The block is composed of the character shown in FIG. 3, and is composed of, as shown in the diagram, prolog area (NAD, PCB, LEN), an information area (INF), and an epilog area (EDC). Each area is briefly described below.

[Prolog Area]

The prolog area is essential, and is composed of 3 bytes as shown.

1) NAD: Node address (explained in FIG. 5 below).

This is to express the address of the transmission side and reception side of the block.

2) PCB: Protocol control byte (explained in FIG. 6 to FIG. 8)

This is to express information necessary for data transmission. By this byte, the I block, S block, and R block are distinguished.

3) LEN: Length

This is to express the number of bytes in the subsequent information area.

[Information Area]

The presence of the information area is arbitrary. If existing, either the transmission data in the I block used in the application (for example, writing into the data memory of the IC card), or the control information or state information in the S block is transmitted. The default value of the information area in the I block is 32 bytes. [Epilog Area]

The epilog area is essential, and is used in error detection of transmission block. Generally, a lateral redundancy code (LRC) is applied, and 1 byte of exclusive OR from the prolog area to the final byte of the information area is added.

Figure 5:
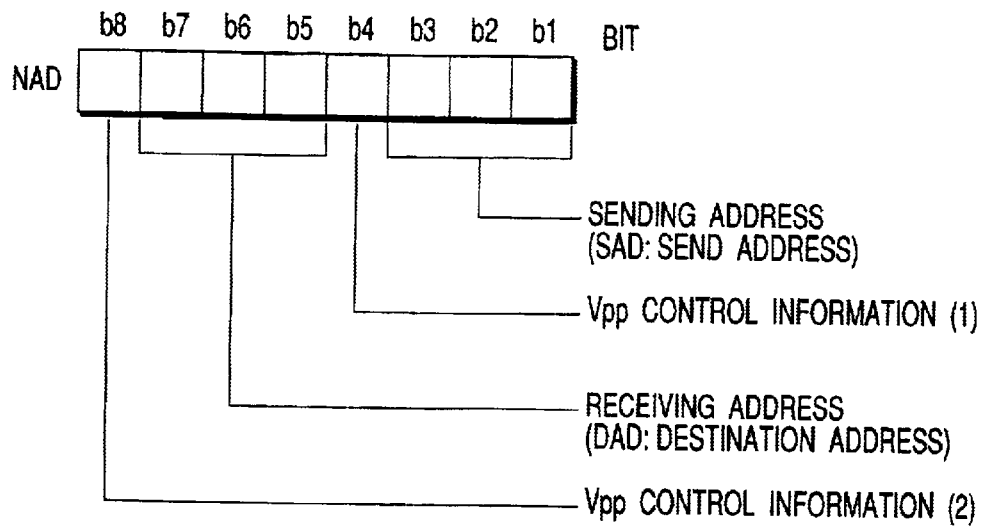
FIG. 5 is a diagram showing detail of node address (NAD)

FIG. 5 shows the detail of the node address (NAD). The node address shows the address at the transmission side and reception side of the transmission block, and when plural logic connections are present at the same time (for example, enter and leave control system), it is used to distinguish them.

Bits b3 to b1 show the send address (SAD), and bits b7 to b5 show the destination address (DAD). Bits b8 and b4 are used for state control of Vpp terminal (used in write control of data memory in the IC card from outside), and is not used in the general IC card.

The SAD and DAD of the first block for a connection device (for example, terminal device 13) to the IC card 11 designate the combination of node addresses of the connection device making communication and the IC card 11. The communication in other block than the logic connection is realized by a different combination of SAD and DAD. When this address system is not used, the values of SAD and DAD are both set to "0". The combination of node addresses having same values of SAD and. DAD other than 0 is reserved for future use in the ISO/IEC7816-3.

Figure 6:
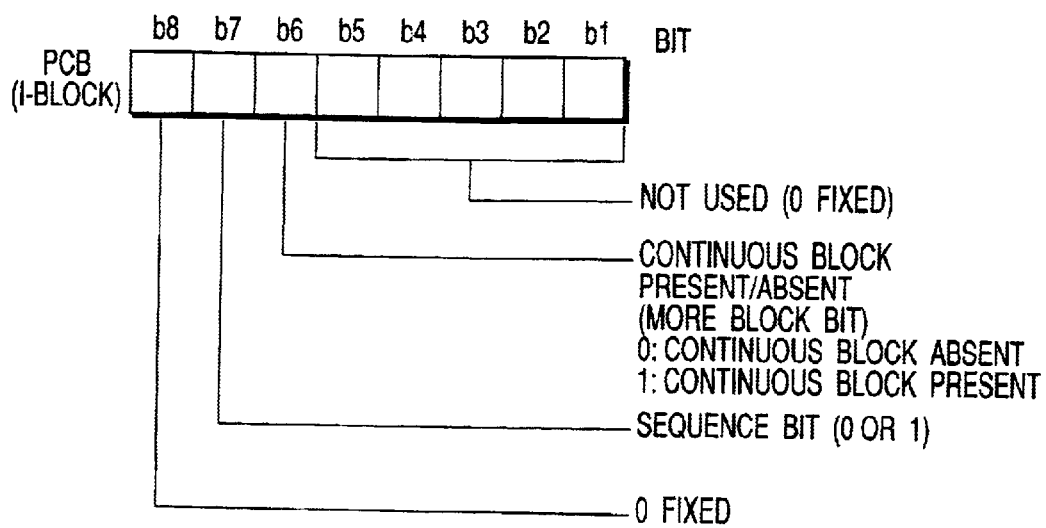
FIG. 6 is a diagram showing PCB format of I block.

FIG. 6 shows a PCB format of I block. The I block is distinguished when bit b8 of the PCB is "0". A sequence bit b7 adds "1" every time I block is sent out, and is counted in a modulo 2. That is, "0" and "1" are sent out alternately. The sequence bit b7 is counted independently in the connection device and IC card 11.

When all of transmission data cannot be sent out in one block, a block chain function of protocol is available, and it is realized by setting "1" in continuous block presence or absence bit b6. The four values available for the I block are shown below.

Figure 7:
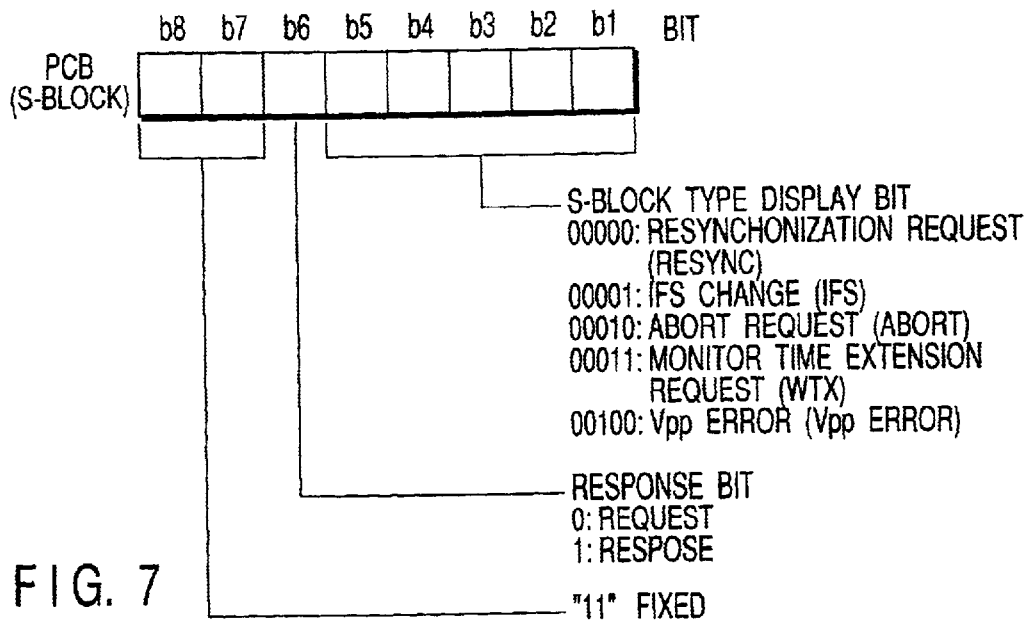
FIG. 7 is a diagram showing PCB format of S block.

1) 00h: Sequence bit=0, continuous block absent
2) 40h: Sequence bit=1, continuous block absent
3) 20h: Sequence bit=0, continuous block present
4) 60h: Sequence bit=1, continuous block present FIG. 7 shows a PCB format of S block. The S block is distinguished when both bits b8 and b7 of PCB are "1". A response bit b6 sends the S block by setting "0" when the transmission side requests its function (for example, resync request) by the S block notice, and sends the S block by setting 1 in the response bit b6 when the reception side allows its function. The S block includes resync which is a function for initializing (returning to zero) the sequence bits of both reception side and transmission side, IFS (information field size change which is a function for extending the information area of the block from the transmission side, abort which is a function of interrupting the block chain function, monitor time extension which is a function for extending the time when the process exceeds the processing time specified in the protocol after the IC card has received the I block, and Vpp error notice which is a function for noticing Vpp error (terminal activation error, etc.) by the connection device to the IC card 11.

The nine values available for the S block are shown below. The value 1) is issued only from the connection device, and is not issued (requested) from the IC card 11. In the general IC card, the Vpp terminal is rare, and it is hardly used.

Figure 8:
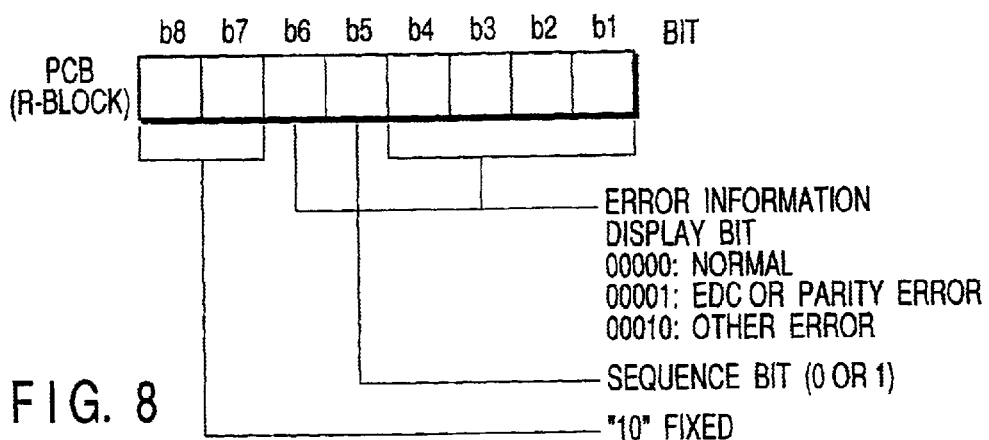
FIG. 8 is a diagram showing PCB format of R block.

1) C0h: Resync request
2) E0h: Resync response
3) C1h: IFS change request
4) E1h: IFS change response
5) C2h: Abort request
6) E2h: Abort; response
7) C3h: Monitor time extension request
8) E3h: Monitor time extension response
9) C4h: Vpp error notice FIG. 8 shows a PCB format of R block. The R block is distinguished when bits b8 and b7 of the PCB are "1" and "0", respectively. A sequence bit b5 is set in the same value as the sequence bit b7 of the I block at the transmission side expecting reception next time. For example, when the sequence bit b7 of the received I block is set as "1", and when the corresponding block is judged to be an invalid block (for example, parity error), the R block setting "1" in the sequence bit b5 is transmitted, and retransmission of the I block is requested. At this time, in the case of EDC or parity error, error information display bits b6, b4 to b1 area set to "0", "0001", and in the case of other error (for example, when receiving a PCB of format not allowed), the error information display bits b6, b4 to b1 are set to "0" and "0010".

In the R block, the received text is used also in affirmative response when using block chain function. For example, when the sequence bit b7 of the received I block is set at "1", and the continuous block presence or absence bit b6 is set at "1", the R block setting sequence bit b5 at "0" is transmitted, which is meant to urge transmission of next block to the transmission side. At this time, for normal block notice, all error bits b6, and b4 to b1 are set to "0".

The six values available for the R block are shown below.

1) 80h: Sequence bit=0 is requested, normal (no error)
2) 90h: Sequence bit=1 is requested, normal (no error)
3) 81h: Sequence bit=0 is requested, EDC or parity error
4) 91h: Sequence bit=1 is requested, EDC or parity error
5) 82h: Sequence bit=0 is requested, other error
6) 92h: Sequence bit=1 is requested, other error <First Embodiment>

A first embodiment is an application of a protocol process setting method for selecting and applying part of process on the protocol between the connection device and IC card, which is a feature of the invention, in the definition of the R block.

Figure 9:
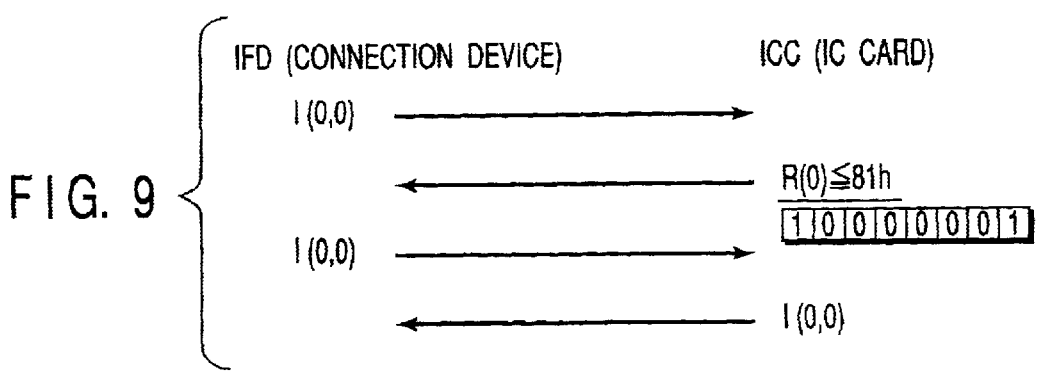
FIG. 9 is a diagram showing processing in the case of EDC error found in I block from a connection device as an application example in R block in a first embodiment of the invention.
Figure 10:
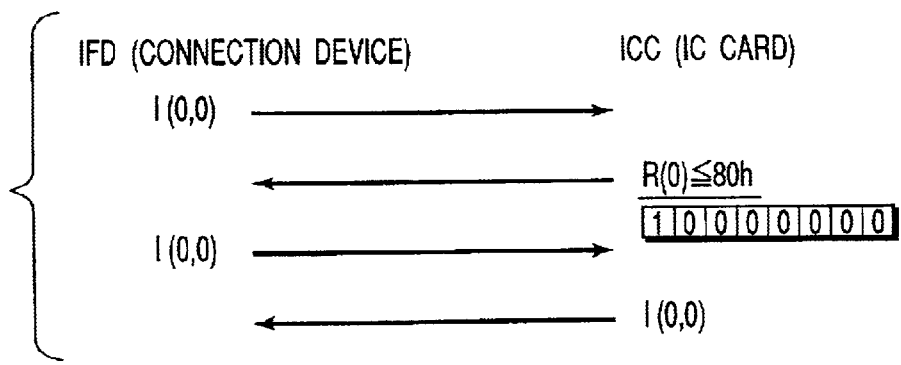
FIG. 10 is a diagram showing processing in the case of EDC error found in I block from a connection device as an application example in R block in the first embodiment of the invention.

FIGS. 9 and 10 show the process when an EDC error is found in the I block from the connection device as an application example of the invention in the R block. In the diagrams, IFD (interface device) shows a connection device (terminal device 3), and ICC represents the IC card 11. The abbreviations of the I block and R block transmitted and received between the connection device and the IC card 11 are meant as follows. (The same meaning is defined also in FIG. 11 and FIG. 12.)

I (S, M)→S=sequence bit of corresponding I block
    M=continuous block presence or absence bit:
       0→absent
    1→present
R (S)→S=request sequence bit to next reception I block As explained in FIG. 8, the R block has a function of noticing the error of reception block to the connection device in the error information display bit.

In FIG. 9, in the R block (R(0)=81h) for noticing the EDC error (00001) to the transmission side in the error display bit, retransmission of invalidated I block is requested. This notice manner may be standard, but in the life cycle of manufacture stage or issue stage, the terminal device side is considered to be mostly applicable in such notice manner. Therefore, by detecting the life cycle information, when the portable electronic apparatus is in the manufacture stage or issue stage, a method of transmitting the error information display bit in FIG. 9 is selected. Of course, instead of referring to the life cycle information, it is also preferable to select by referring to the designation information.

On the other hand, in FIG. 10, the IC card 11 judges the I block as invalid block (EDC error is detected), but the R block (R(0)=80h) is transmitted by regarding the error information bit to be normal (00000). Such method of transmission is sometimes effective in the application stage of the portable electronic apparatus, and it is not always applicable to the error information display depending on the type of the terminal device. Therefore, by detecting the life cycle information, when the portable electronic apparatus is in the application stage, regarding the error information display bit in FIG. 10 to be normal (00000), a method of transmitting the R block (R(0)=80h) is selected. This selection is not intended to refer to the life cycle information, but is preferable when selecting by referring to the designation information.

Thus, the IC card of the invention refers to the life cycle information (or designation information in area 102a) in the area 102b of the data memory 102, and executes by selecting one of the process in FIG. 9 or process in FIG. 10, for example, in part of the protocol processing depending on the designation on the basis of the life cycle (manufacture, issue, application) shown by this life cycle information.

That is, the processing in FIG. 9 is a general EDC error detecting process as compared with FIG. 10, but in a special system (for example, intranet of enter and leave control), paying attention only to the retransmission request which is a principal function of the R block, a process not referring to the error display bit may be considered. In such system, when transmitted by adding error display bit, the IC card may be judged to be abnormal. Therefore, when the life cycle is in the manufacture stage or issue stage, the process in FIG. 9 is executed by the IC card issuing machine, and when the life cycle is in the application stage, by employing the process in FIG. 9, by selecting part of the protocol process depending on the situation, a portable electronic apparatus of high reliability and capable of processing protocol efficiently can be presented.

Figure 13:
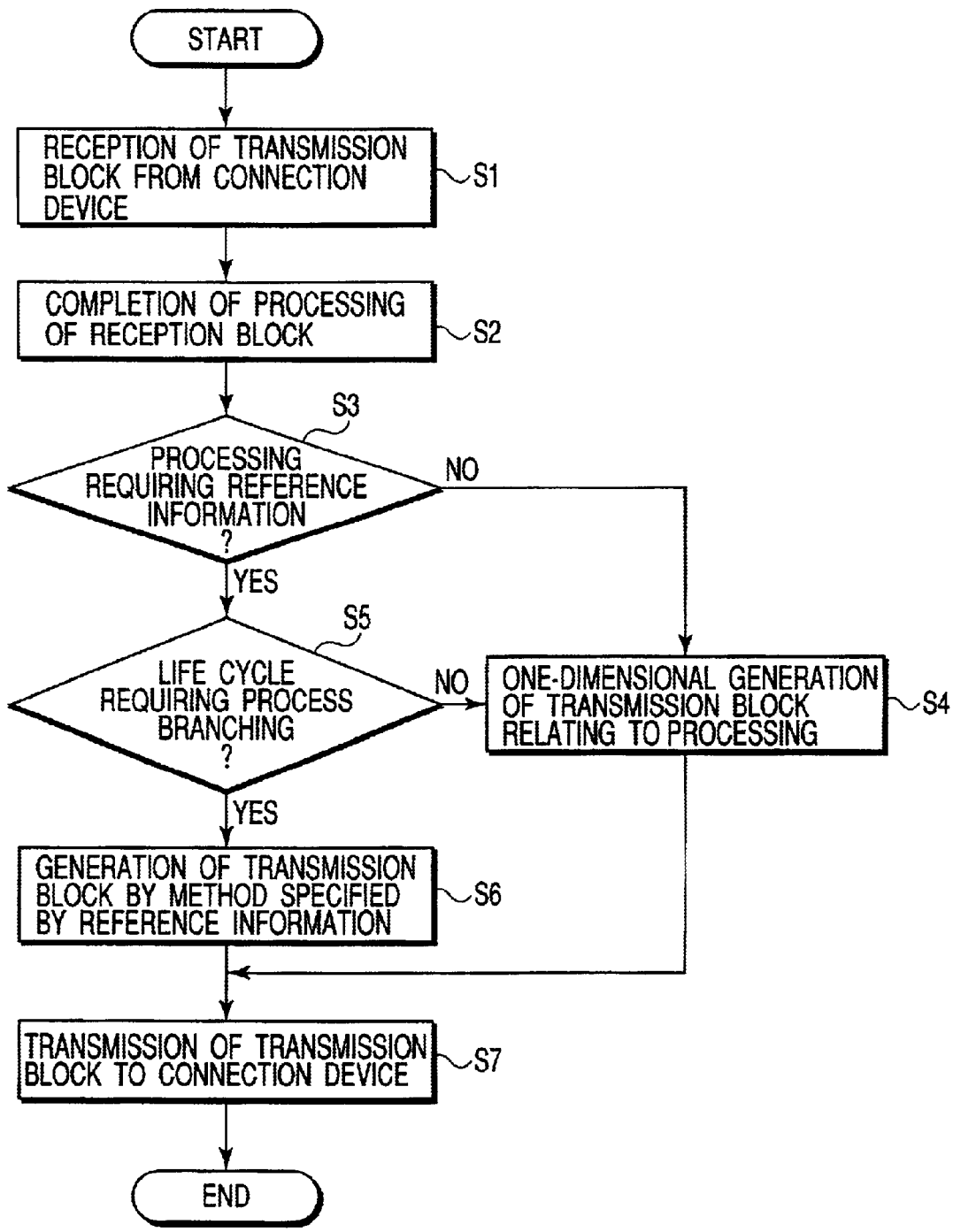
FIG. 13 is a flowchart explaining the processing operation in the case of EDC error found in the first embodiment of the invention.

Referring now to the flowchart in FIG. 13, the processing operation in the first embodiment of the invention is described. First, at step S1, a transmission block from the connection device (terminal device 13) is received. At next step S2, proper processing is conducted to the reception block (for example, writing process of transmission data into memory in the case of I block, response processing in the case of S block, and retransmission process in the case of R block).

Consequently, at step S3, by analyzing the processing result at step S2, it is judged whether the reference information (designation information for designating protocol process) is necessary or not for generation of the transmission block, and the process advances to step S4 when judged not necessary, and jumps to step S5 when judged necessary.

At step S4, a transmission block one-dimensionally corresponding to the connection device is generated from the processing result at step S2, and the process goes to step S7. At step S7, the generated transmission block is transmitted to the connection device. On the other hand, at step S5, by referring to the life cycle information stored in the data memory 102, it is judged whether the present life cycle of the IC card 11 requires the reference information (life cycle information) stored in the data memory 102 or not, and the process returns to step S4 when judged not necessary, and goes to step S6 when judged necessary.

Figure 12:
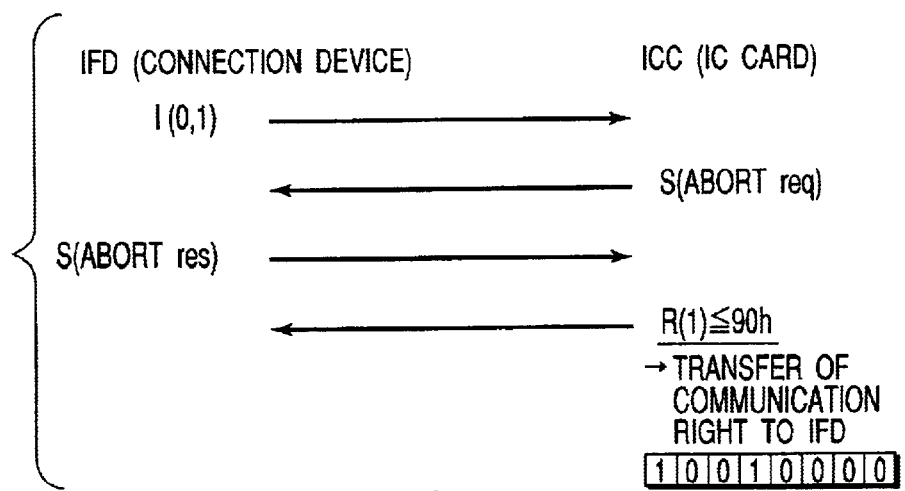
FIG. 12 is a diagram showing processing in the case of error other than protocol found in I block from a connection device as an application example in S block in the second embodiment of the invention.

At step S6, on the basis of the method designated by the reference information in the data memory 102, a transmission block to the connection device is generated selectively (corresponding to the transmission block generation process expressed by underlined characters in FIG. 9 or FIG. 12), and the generated transmission block is transmitted to the connection device at step S7.

<Second Embodiment>

A second embodiment is an application of a protocol process setting method for selecting and applying part of process on the protocol between the connection device and IC card, which is a feature of the invention, in the definition of the S block.

Figure 11:
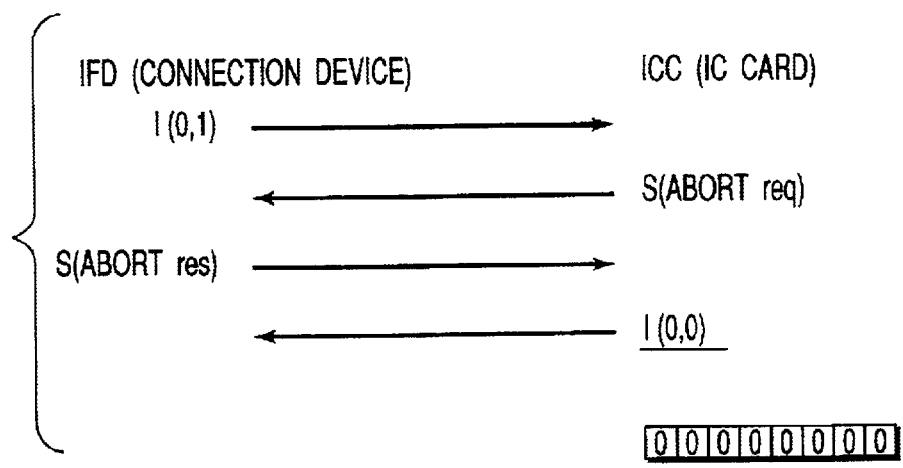
FIG. 11 is a diagram showing processing in the case of error other than protocol found in I block from a connection device as an application example in S block in a second embodiment of the invention.

FIG. 11 and FIG. 12 show the process when an error other than protocol error (for example, abnormality of transmission data) is found in the I block in which the I block from the connection device makes a block chain as an application example of the invention in the S block.

In the diagrams, abbreviations of the S block transmitted and received between the connection device (IFD) and the IC card (ICC) are meant as follows.

S (\*\*req)→\*\*=designation function in S block
  req=request (designation function is requested)
S (\*\*res)→\*\*=designation function in S block
  res=response (designation function is affirmative)

In the ISO/IEC7816-3, when interrupting the block chain function, it is specified to use the abort function of the S block. Herein, the process after transmission of abort response which is an affirmative answer of abort request, two cases are considered as shown in FIG. 11 and FIG. 12.

That is, as shown in FIG. 11, when a status error is noticed in the I block (the error status is described in ISO/IEC7816-4), the transmission right is transferred to the partner side in the R block as in FIG. 12 (described in ISO/IEC7816-3).

In the case of FIG. 11, during transmission of data from the connection device, when an abort request is transmitted and a corresponding abort response is transmitted, the reason of refusing continuance is noticed accordingly. Similarly to the first embodiment, when the life cycle is in the manufacture stage or issue stage, this general transmission method is estimated to be processed without problem at the terminal device side, and hence when the life cycle is in the manufacture stage or issue stage, an error status data showing the reason of refusal of continuation is noticed as shown in FIG. 11.

However, when the life cycle is in the application stage, it is not known what kind of terminal device is prepared, and as shown in FIG. 11, if an error status showing the error cause is noticed, it may cause malfunction. In this case, therefore, the transmission method of transferring only the communication right as shown in FIG. 12 is effective. However, the second embodiment, same as in the first embodiment, on the basis of changing part of protocol processing, it is not always necessary to correspond to the life cycle information, but, for example, it may be selected by the designation information capable of merely rewriting from the outside as in the first embodiment.

Figure 14:
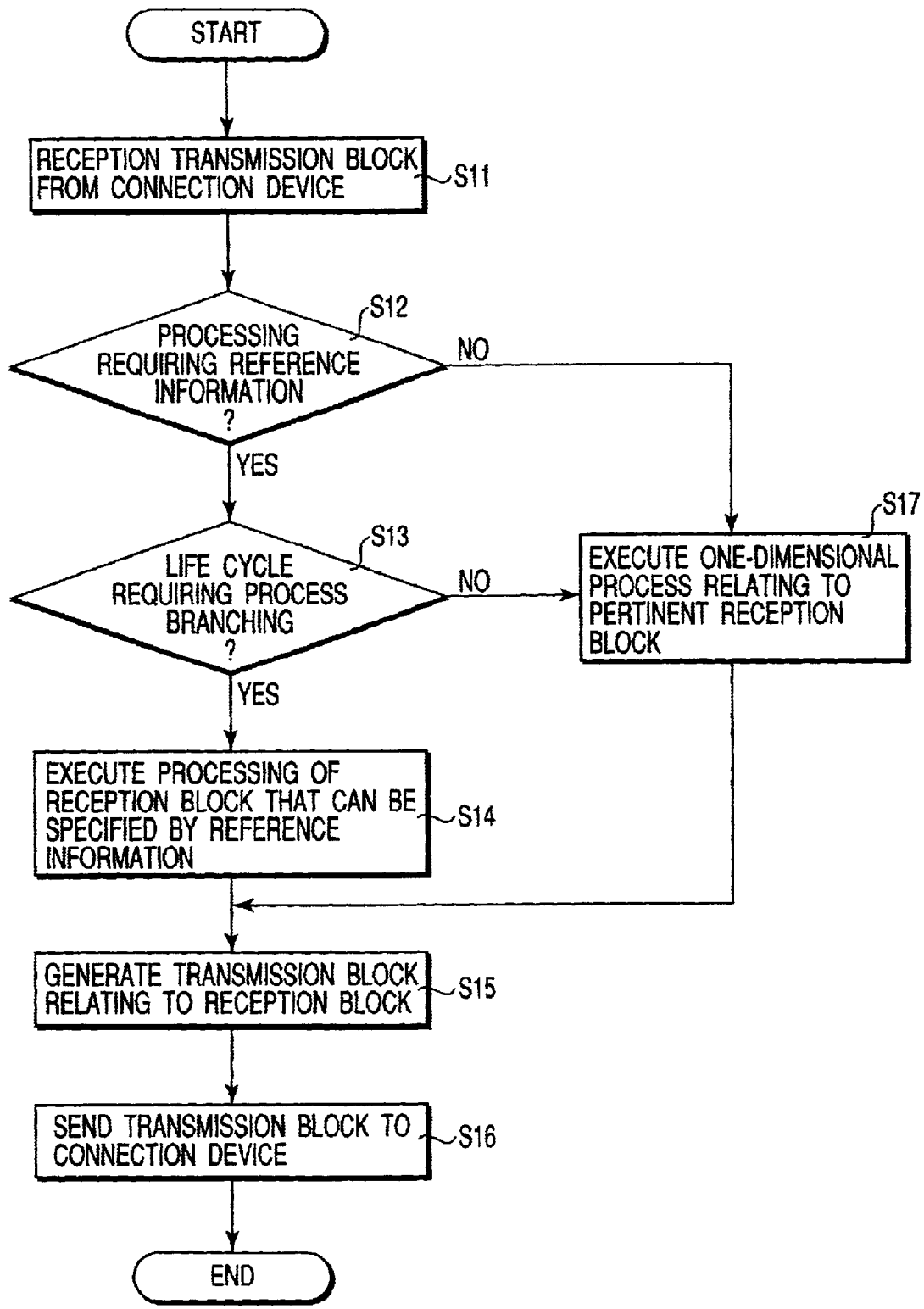
FIG. 14 is a flowchart explaining the processing operation in the case of error other than protocol found in the second embodiment of the invention.

FIG. 14 is a flowchart explaining the procedure of the second embodiment. In FIG. 14, when a transmission block is received from the connection device (S11), the portable recording medium, in the case of process not requiring reference information (S12), executes a one-dimensional process about the reception block (S17). When the reference information is necessary, by referring to it, when judged to be the life cycle requiring process branching (S13), process of reception block that can be designated by the reference information is executed (S14). That is, when the life cycle is judged to be the application stage, as in FIG. 11, a case may be considered to notice error status showing the reason of refusal of continuation, and the transmission block is generated accordingly (S15). After generation, transmitting the transmission block to the connection device, the process is terminated (S16).

As explained herein, according to the invention, inside the IC card, plural choices are prepared for part of protocol processing, and the designation information for designating it, and the life cycle information updated in every life cycle are provided, and if an event relating to the corresponding transmission block occurs, part of processing is determined according to the designation information and life cycle information, and the protocol process is executed accordingly. As a result, part of protocol processing can be realized selectively, and a portable electronic apparatus capable of selectively realizing protocol processing depending on the stage of life cycle and environment of use is presented.

According to the invention as explained herein, the function can be selected in part of protocol processing, and a portable electronic apparatus capable of communicating by a protocol suited to the stage of the life cycle and environment of use can be presented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable electronic apparatus comprising:
   storing means for storing designation information for designating choices for proper processing in a storage region;
   input and output means connected to an external device, for inputting and outputting of data;
   processing means, having plural choices at least in part of a specified protocol, for processing the input and output data of the input and output means according to the specified protocol; and
   control means for selecting a proper one out of the plural choices of the processing means according to the designation information stored in the storage means and controlling to process communication with the external device by using the input and output means and the processing means according to the specified protocol including the selected choice, the control means including means for controlling communication with the external device by using the input and output means and the processing means, depending on the specified protocol including the selected process, by selecting a proper one from the process of transmitting and the process of not transmitting the error information display bit of R block of protocol control byte of the prolog area of the block for transmission and reception.

2. A portable electronic apparatus comprising:

storing means for storing designation information for designating choices for proper processing in a storage region;

input and output means connected to an external device, for inputting and outputting of data;

processing means, having plural choices at least in part of a specified protocol, for processing the input and output data of the input and output means according to the specified protocol; and control means for selecting a proper one out of the plural choices of the processing means according to the designation information stored in the storage means and controlling to process communication with the external device by using the input and output means and the processing means according to the specified protocol including the selected choice, the control means including means for controlling communication with the external device by using the input and output means and the processing means, depending on the specified protocol including the selected process, by selecting a proper one from, the process of transmitting and the process of not transmitting the error status notice, to the response signal to the abort request of S block of protocol control byte of the prolog area of the block for transmission and reception.

3. A communication method of portable electronic apparatus comprising:

storing designation information for designating choices for proper processing in storage regions;

selecting a proper one from plural choices on the basis the designation information stored at the storing step by preparing plural choices at least in part of a specified protocol; and controlling to communicate with the external device according to the specified protocol including the choice selected at the selecting steps, wherein the selecting includes preparing the process of transmitting and the process of not transmitting the error information display bit of R block of protocol control byte of the prolog area of the block for transmission and reception, and selecting a proper one according to the designation information stored at the storing step.

4. A communication method of portable electronic apparatus comprising:

storing designation information for designating choices for proper processing in storage regions;

selecting a proper one from plural choices on the basis the designation information stored at the storing step by preparing plural choices at least in part of a specified protocol; and controlling to communicate with the external device according to the specified protocol including the choice selected at the selecting steps, wherein the selecting includes preparing the process of transmitting and the process of not transmitting the error status notice, to the response signal to the abort request of the S block of protocol control byte of the prolog area of the block for transmission and reception, and selecting a proper one according to the designation information stored at the storing step.

* * * * *